No. 747,195. PATENTED DEC. 15, 1903.
C. E. LOVERCHECK.
GRAIN SHOCKER.
APPLICATION FILED AUG. 11, 1902.
NO MODEL. 8 SHEETS—SHEET 1.

No. 747,195. PATENTED DEC. 15, 1903.
C. E. LOVERCHECK.
GRAIN SHOCKER.
APPLICATION FILED AUG. 11, 1902.
NO MODEL. 8 SHEETS—SHEET 3.

No. 747,195. PATENTED DEC. 15, 1903.
C. E. LOVERCHECK.
GRAIN SHOCKER.
APPLICATION FILED AUG. 11, 1902.
NO MODEL. 8 SHEETS—SHEET 5.

Witnesses
C. E. Lovercheck, Inventor
by C. A. Snow & Co.
Attorneys

No. 747,195. PATENTED DEC. 15, 1903.
C. E. LOVERCHECK.
GRAIN SHOCKER.
APPLICATION FILED AUG. 11, 1902.
NO MODEL.
8 SHEETS—SHEET 8.

Witnesses
C. E. Lovercheck, Inventor.
by
Attorneys

No. 747,195. Patented December 15, 1903.

UNITED STATES PATENT OFFICE.

CHARLES E. LOVERCHECK, OF HEBRON, NEBRASKA.

GRAIN-SHOCKER.

SPECIFICATION forming part of Letters Patent No. 747,195, dated December 15, 1903.

Application filed August 11, 1902. Serial No. 119,321. (No model.)

*To all whom it may concern:*

Be it known that I, CHARLES E. LOVERCHECK, a citizen of the United States, residing at Hebron, in the county of Thayer and State of Nebraska, have invented a new and useful Grain-Shocker, of which the following is a specification.

The object of my invention is to provide an improved mechanism for receiving bundles or sheaves of grain—such as wheat, rye, or the like—from a binding-machine and assembling the same to form a shock, such shocks being deposited on the ground at intervals and each shock containing precisely the same number of sheaves.

A further object of the invention is to insure the deposit of the assembled shocks in proper position on the ground without stopping the travel of the binder or the shocker.

A still further object of the invention is to so construct the mechanism that all of its connected parts may be operated automatically from the grain-binder and without the necessity of employing any manual labor whatever.

With these and other objects in view the invention consists in the novel construction and arrangement of parts hereinafter described, illustrated in the accompanying drawings, and particularly pointed out in the appended claims.

In the accompanying drawings.

Similar characters of reference are employed to indicate corresponding parts throughout the several figures of the drawings.

10 designates a wheeled frame having at its rear end a number of vertically-disposed bars 11, connected at their upper ends by a series of timbers or metal bars to form a supporting-frame for that portion of the mechanism employed for depositing the shock of grain on the ground. The shock-assembling mechanism is disposed on the horizontal portion of the frame at a point close to the ground, so that the shock may be more readily and safely discharged. The horizontal side sills 14 of the frame form guideways for the reception of antifriction-rollers 15, mounted on studs or spindles projecting from a rectangular frame 16, the latter serving as a support for a revoluble shock-assembling platform 17. The transverse bars 18 of the frame 16 are connected to each other and provided with pivotal bearings for the reception of a pair of vertically-disposed shafts 19 and 20, the latter being located at the center of the platform 17 and forming a pivot on which said platform revolves. The two shafts are provided with sprocket-wheels 21, connected by a link belt 22, and an intermittent rotative movement is imparted to the shaft 19 through the medium of a pawl 23, adapted to engage with a ratchet-wheel 24, secured to the shaft. The teeth of the ratchet-wheel are of a number equal to the number of sheaves to be assembled in each shock, and after said ratchet-wheel has received one complete rotation the platform is provided with a sufficient number of sheaves to form a shock, which is then automatically deposited on the ground. The ratchet-wheel is rotated to the extent of a single tooth by each operation of the mechanism, which receives the successive sheaves from the binder and deposits the same on the platform. At one side of the horizontal portion of the frame is a lateral-projecting bracket 26, and a short distance in front of the bracket 26 is a second bracket 27, these two brackets being provided with bearings for the reception of a shaft 28, extending longitudinally of the machine and provided with a sprocket-wheel 29, which is loosely mounted on the shaft and receives constant motion from the grain-binding machine through the medium of a link belt 30. To the hub of the sprocket-wheel is rigidly secured a miter-gear 31, intermeshing with a similar gear 32, carried by a stud 33, projecting from the upper surface of a bracket 26. The head of the stud projects beyond and above the miter-gear 32 and is provided with a recessed lug 34, to which is pivoted an arm 35, the latter being operated in such manner as to receive both a vertical and an oscillatory movement in the manner hereinafter described.

At the outer end of the arm 35 is pivoted a block 36, which may be moved to either a horizontal or vertical position, and on said block are arranged two upwardly-extending lugs 37, to which is pivoted a bracket 38, having at its opposite ends a pair of transversely-disposed bars 39. The bars 39 form bearings for two parallel shafts 40 and 41, to each of which are secured a number of curved tines or prongs 42, said tines or prongs being so arranged that when in receiving position below the discharge-throat x of the binder they will form a substantially semicircular trough or basket for the reception of a sheaf of grain. The shafts are provided with intermeshing pinions 43, with one of which engages a pawl 44, adapted to hold the two shafts in any position to which they may be adjusted. The pawl is of the gravity type, being provided with a counterweight 45, which projects for some distance below the transverse bars 39, and at the delivery-point, where the sheaf is deposited on the platform, this pawl is automatically tripped to permit the return of the tines to sheaf-receiving position.

Figures 3, 23:
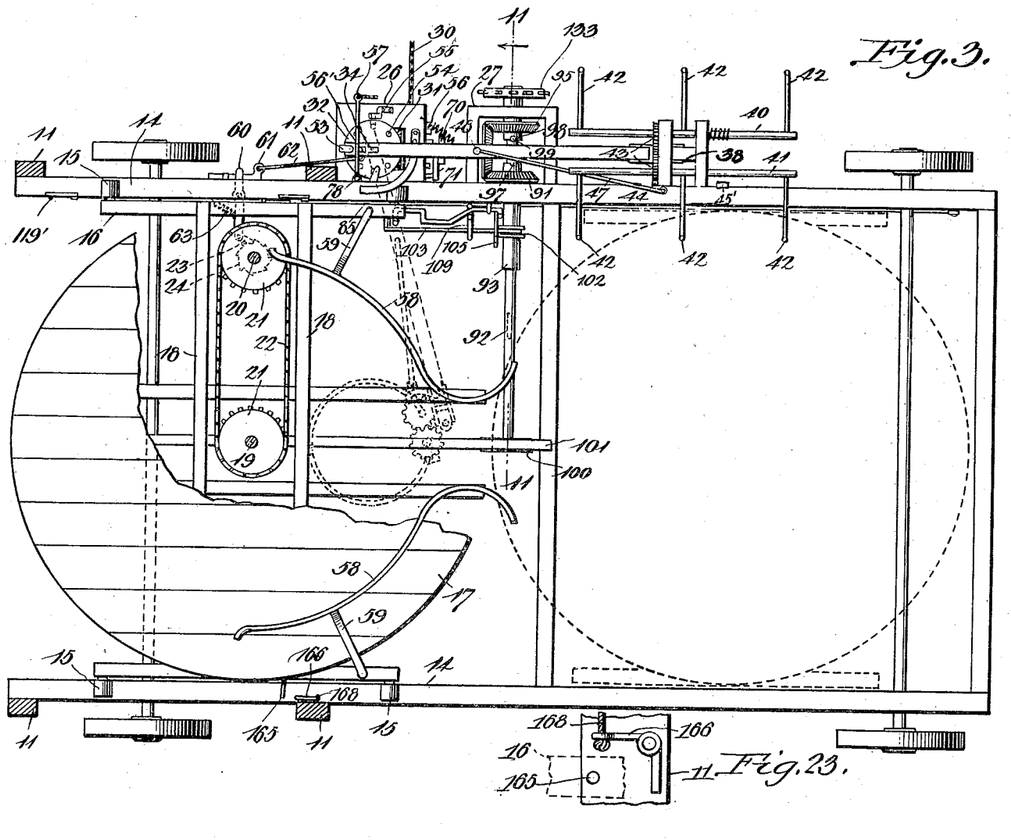
Fig. 3 is a sectional plan view of the device on the line 3 3 of Fig. 2.
Fig. 23 is a detail view of the bell-crank lever operated by a movement of the platform to release the shock formed and allow the same to descend to the platform.
Figures 4, 5, 6, 7:
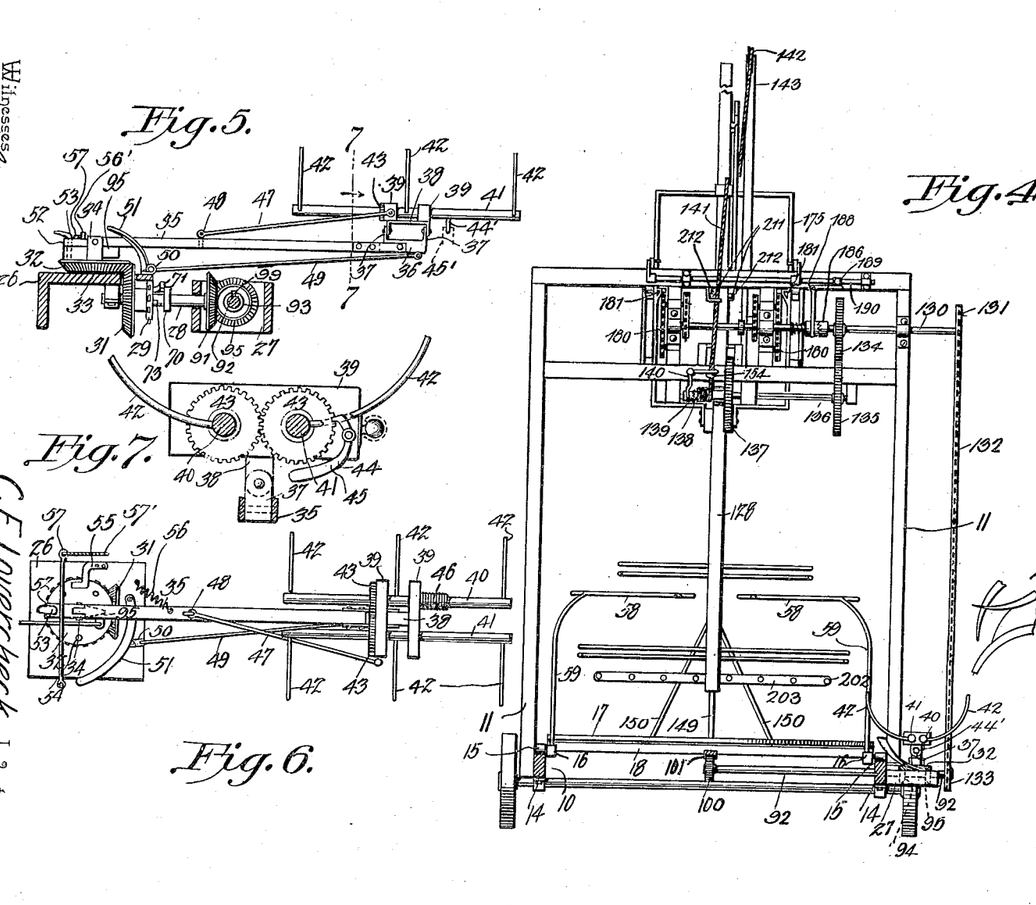
Fig. 4 is an elevation, partly in section, looking from the front end of the machine.
Fig. 5 is a detail view of the forks or tines for receiving the sheaves from the binder and assembling the same in the form of a shock.
Fig. 6 is a plan view of that portion of the machine shown in Fig. 5.
Fig. 7 is a sectional detail, on an enlarged scale, on the line 7 7 of Fig. 5.

Depending from the shaft 40 is a pin 44', Fig. 5, which when the arm 35 is moved from the position shown in full lines to that indicated in dotted lines in Fig. 3 will at the beginning of the movement engage a block or stud 45', projecting from the side of the frame, and cause a slight rotative movement of both shafts, the tines being thus forced inwardly and closing around the sheaf of grain, holding the same firmly during the movement toward the assembling-platform. When the tines are closed together, they are held by the pawl 44, and when the latter is released the tines are opened out by means of a helical torsion-spring 46, coiled around a portion of the shaft 40 and having one end secured to said shaft and its opposite end to one of the transverse bars 39.

To the inner end of one of the bars 39 is swiveled one end of a rod 47, the opposite end of which is connected to an eye 48 on the upper surface of the arm 35, and to the lower portion of the block 36, at a point beyond the pivot-pin of the latter, is connected one end of a rod 49, having its opposite end pivotally connected to an eye 50, pivoted on the bracket 26. When the arm 35 is turned, with the stud 33 as a center, the tines are closed together on the sheaf of grain, as previously described, and as the movement of the arm continues the connecting-rod 49 between the block 36 and the bracket serves to gradually turn said block to a vertical position, the two shafts 40 and 41 being similarly moved and the sheaf of grain raised to a vertical position, so that its lower end or the bottom of the sheaf may come into contact with the receiving-platform. On the movement of the arm the connecting-rod 47 between the cross-bar 39 and the arm 35 serves to swing the upper bar 38 on the pivot-pin which connects it to the lug 37, the plane in which the two axes of the shafts 40 and 41 are situated being then substantially vertical or at a right angle to the longitudinal axis of the machine. The tines thus present the sheaves properly to the platform, and the discharging movement is effected by the contact of the counterweighted portion 45 of the pawl 44 with one of the pivotal lugs 37, the shafts being then partly rotated by means of the torsion-spring 46 and the tines opened to release the sheaf. As the horizontal plane of the arm 35 is but a trifle above the plane of the platform when in receiving position, it becomes necessary to slightly elevate the outer end of the arm in order that the sheaf may be raised slightly above the platform when turned to vertical position, and this is accomplished by means of a curved bar 51, carried by the bracket 26 and arranged to form an ascending plane, on which the arm 35 rests during its oscillatory movement.

The rocking movement of the arm 35 takes place through an angle of about ninety degrees, and in order to gain this intermittent oscillatory movement from the continuously-revolving miter-gear 32 said arm is provided with a rearwardly-extending lug 52, carrying a vertically-adjustable pin 53, adapted to engage in any one of a series of openings 54, formed in the upper surface of the miter-gear 32. At a point on the bracket adjacent to the position assumed by the lug 52 when the arm 35 has completed its inward movement is an arm 55, having its upper surface inclined and adapted to engage a projecting tongue at the top of the pin and raise the same from engagement with the opening in the miter-gear, thus releasing the arm and permitting the latter to assume an initial position through the medium of a tension-spring 56. When the pin 53 is raised from engagement with one of the openings in the miter-gear, a recess 55' in said pin is brought into alinement with a locking-dog 56', movable in a radial slot or opening in the end of the arm 35 and normally held in position to engage the slot of the pin by a small compression-spring. The dog is provided with an upwardly-extending lug, with which may engage an arm 57, operated by a rod or cord 57' from a movable member of the binder-throat or at any other convenient point from which movement may be transmitted to effect the release of the dog from the pin as soon as a sheaf is dropped into the tines carried by the arm 35. When the arm is revolved to sheaf-delivery position, the pin 53 is raised from the miter-gear and is held locked in elevated position by the locking-dog 56' during all the time the tenison-spring 56 is acting to return the arm to initial position and is held elevated until such time as the prongs receive a sheaf from the binder, the arm 57 being then automatically operated to release the dog and permit the pin to drop in readiness to enter the first of the openings 54 which may pass below the pin. When the arm has been moved to a position to deliver a sheaf of grain to the platform, said sheaf is in a position immediately between a pair of curved arms or bars 58, carried by vertical standards 59, projecting upwardly from the platform carrying frame 16, the guards being held stationary and serving to properly support the sheaves as the latter are successively delivered to the platform. Each time a sheaf of grain is delivered to the platform the ratchet-wheel 24 is revolved to the extent of a single tooth, and to accomplish this result the actuating-pawl 23 is pivotally connected to a pivoted bar 60, the outer end of which projects through an opening in one of the sills 14 and is engaged by a reciprocating block 61.

Figures 8, 9, 10, 20:
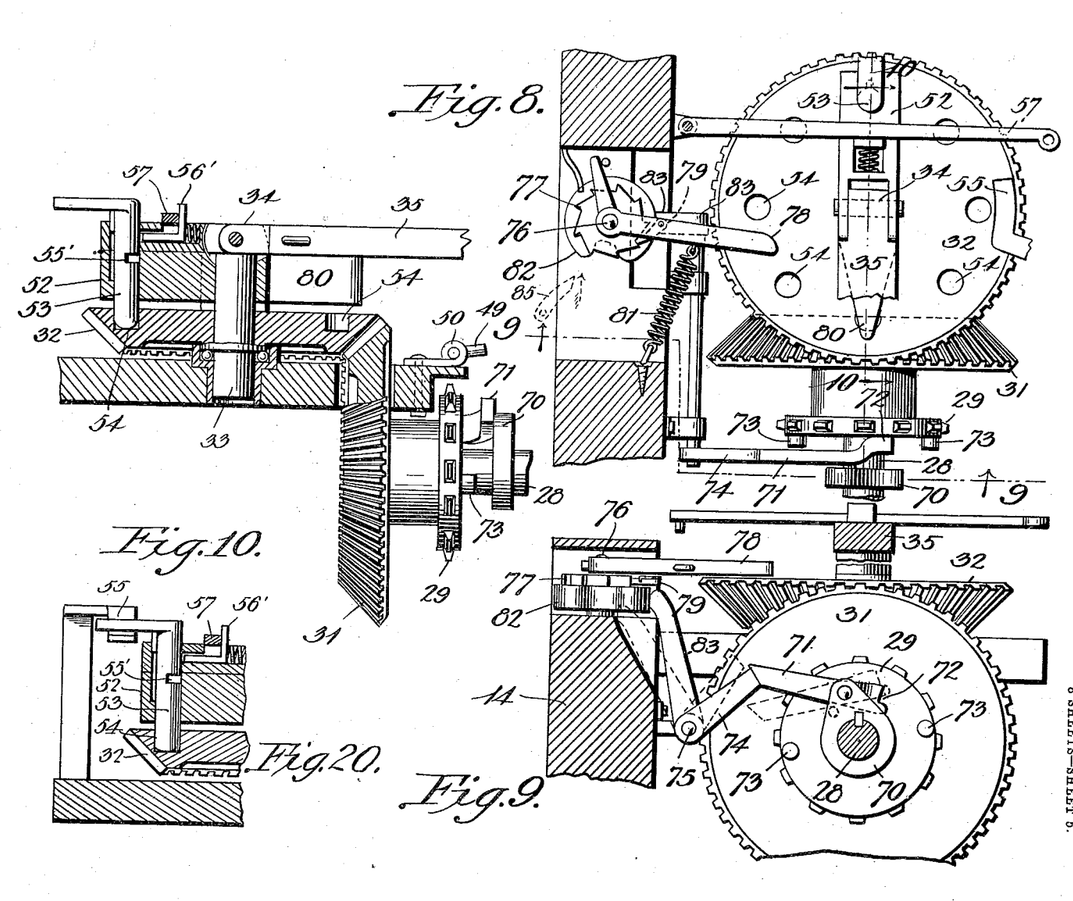
Fig. 8 is a detail plan view, on an enlarged scale, of a portion of the operating mechanism.
Fig. 9 is a transverse sectional elevation of the same on the line 9 9 of Fig. 8.
Fig. 10 is a detail sectional view on the line 10 10 of Fig. 8.
Fig. 20 is a sectional elevation of a portion of the operating mechanism shown in Figs. 8 and 10, the parts being illustrated in different position.

The block 61 is connected by the link 62 to the arm 35, and as the latter is on its delivery movement said block receives a movement sufficient to move the pawl 23 in the direction of the rear of the machine to engage a fresh tooth. This movement takes place against the stress of a compression-spring 63, which during the return movement of the arm returns the lever 60 to its initial position, the pawl moving the ratchet-wheel to the extent of a single tooth and a similar movement being imparted to the connecting sprocket-wheels and link belt to the receiving-platform, so that a fresh space is left for the reception of the next sheaf of grain. When the last sheaf of grain necessary to form a shock has been placed on the revoluble platform, it becomes necessary to operate the shock-delivery mechanism and to reciprocate the platform. This is accomplished by the following mechanism: On the normally stationary shaft 28 is keyed a collar 70, having a projecting lug to which is pivoted an arm 71, having one end slightly recessed or rounded, as indicated at 72, for the reception of one or other of a pair of projecting pins 73, extending from the sprocket-wheel 29. This end of the clutch-arm 71 is normally held out of the path of movement of the pins by means of a rocking arm 74, carried on a rock-shaft 75, the end of the arm 71 being inclined, as illustrated more clearly in Fig. 9, at that point where it comes into contact with the rocker-arm. At a convenient point on one of the side sills of the framework is a spindle 76, carrying a ratchet-wheel 77, having one tooth in excess of the number of teeth of the platform ratchet-wheel 24, the latter being provided in the present instance with eight teeth and the platform being adapted to receive eight sheaves of grain to form each shock, while the ratchet-wheel 77 is provided with nine teeth for a purpose presently to be described. Fulcrumed to the ratchet-wheel spindle is an arm 78, carrying a pivoted pawl 79, adapted to engage the teeth of the ratchet-wheel. This arm is disposed in the path of movement of a tongue 80, arranged below the arm 35 and movable with the miter-gear 32 as each sheaf is delivered. When the arm is moved to delivery position, the tongue 80 comes into contact with the arm 78 and moves the latter toward the rear of the machine against the stress of a tension-spring 81, the movement being to the extent of a single tooth, and when the arm is released by the returning movement of the sheaf-delivery arm the spring 81 returns the pawl-carrying arm to its initial position and revolves the ratchet-wheel to the extent of a single tooth, this movement occurring eight times during the formation of each shock and the ratchet-wheel receiving eight-ninths of a revolution. To the spindle 76 is secured a notched disk 82, the notch being arranged in alinement with the eighth tooth of the ratchet-wheel, and after the latter has been moved a sufficient number of times to form a shock the notch is moved opposite to an arm 83 on the rock-shaft 75, said arm entering the notch and serving to raise the arm 74 from engagement with the clutching-arm 71 and permit the latter to assume the dotted-line position shown in Fig. 9, with the recessed end 72 in the path of movement of one or other of the clutching-pins carried by the sprocket-wheel 29. In this position the constantly-rotating sprocket-wheel 29 will engage the arm 71 through the medium of the pin 73 and will transmit power to the normally stationary shaft 28, this latter shaft being provided with connections for transmitting movement to the remaining portions of the mechanism. The arm 83 remains in the recess of the disk during all the time the platform is moving to the full forward position shown by dotted lines in Fig. 3 and then back again to the rear or sheaf-receiving position shown in full lines. When the platform is about stopping on its rearward movement, a pawl 85 on the platform engages the ratchet-wheel 77, moving the same to the extent of a single tooth, and thus forcing the recessed portion of the disk out of alinement with the arm 83 and returning the arm 74 to the position shown in full lines in Fig. 9, the ratchet-wheel being adjusted to such position as on the next eight movements necessary to the completion of a fresh shock the recess will again be moved to a position in alinement with the arm 83. When the arm 74 assumes the full-line position, the continued movement of arm 71 will bring the inclined end of the latter into contact with the end of arm 74, resulting in a camming action, which restores the arm 71 to the position indicated in full lines in Fig. 9 and removing its recessed end from engagement with the power-transmitting pin 73. The shaft 28 is then stopped and remains stationary until the next engagement of the clutch.

At one side of the main frame is the open bracket or frame 27, having a bearing for the reception of one end of the shaft 28, said shaft carrying a bevel-gear 91 at a point within the frame. The frame has bearings for the reception of a transversely-disposed shaft 92, on which slides a sleeve 93, the latter being feathered to the shaft, but free for longitudinal movement thereon. On the sleeve is a loose bevel-gear 94, and on the shaft is a similar bevel-gear 95, both of which intermesh with the gear 91, fixed to the shaft 28, and are rotated by said gear in opposite directions. These loose gears 94 and 95 may be held from longitudinal movement in any suitable manner, as by clips 96, carried by the frame and extending into annular grooves formed in the hubs of the respective gears. The hub of the gear 94 is provided with one or more recesses 97, and similar recesses 98 are formed in the adjacent face of the hub of the gear-wheel 95. These recesses serve to receive a pin 99, carried by a sleeve 93, the latter being longitudinally adjustable to engage said pin with the recesses of either wheel, and thus effect the revoluble movement of the shaft 92 in either direction.

On the shaft 92 is secured a pinion 100, which intermeshes with a rack 101, carried by the platform-frame, the platform by this means being moved to either of the two positions indicated in Fig. 3. The shifting movements are automatic and are accomplished by the movement of the platform, the latter being provided with suitable tripping devices and other actuating mechanism for automatically shifting the positions of the clutching mechanism and various other parts of the apparatus, the movement of which must be timed to correspond with the movement of the platform.

Figures 11, 13:
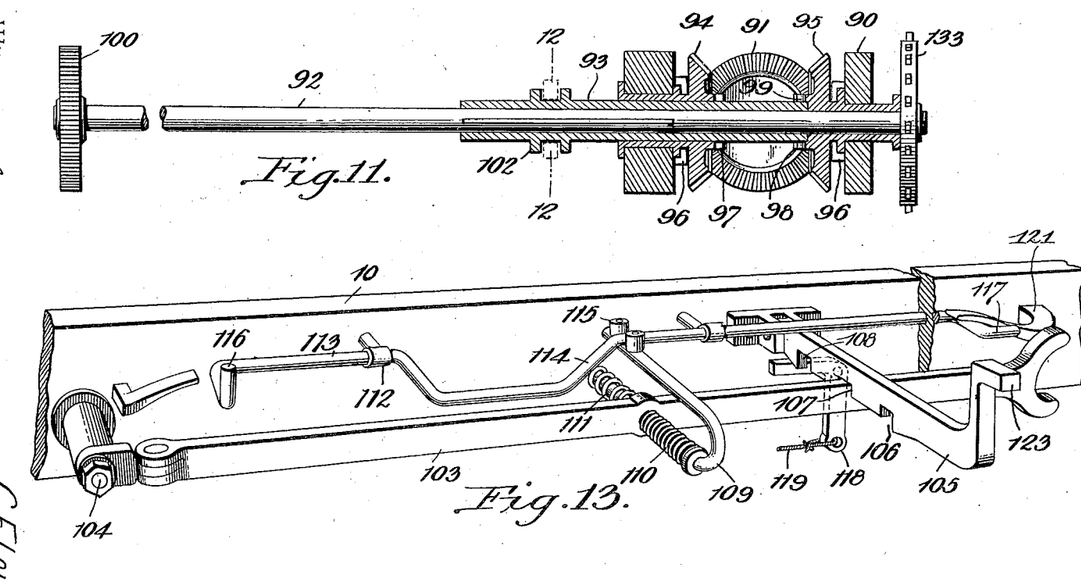
Fig. 11 is a transverse sectional elevation on the line 11 11 of Fig. 3, illustrating a detail of construction.
Fig. 13 is a detail perspective view of a portion of the automatic clutch-shifting mechanism.
Figure 12:
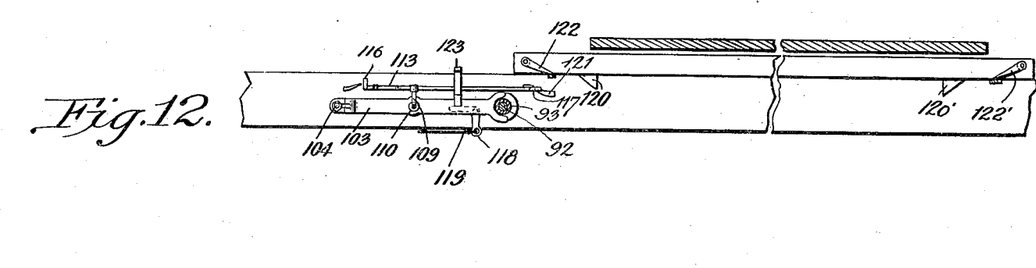
Fig. 12 is a longitudinal sectional elevation, partly on the line 12 12 of Fig. 11, illustrating a portion of the automatic mechanism for shifting the clutch shown in Fig. 11.

The construction of the automatic clutch-shifting mechanism is best shown in Figs. 12 and 13. The slidable sleeve 93 is provided with a grooved collar 102 for the reception of the bifurcated end of a clutch-lever 103, pivoted to a stud 104, projecting from the frame of the machine. The clutch-lever has three positions in which it may be locked by a pivoted latch 105, having three lever-receiver openings 106, 107, and 108, there being suitable mechanism for automatically raising the latch when the movement of the platform is to be started in either direction and, further, to provide for the shifting of the clutch-lever as the platform nears the limit of its travel in both directions. The clutch-lever 103 is provided with a suitable opening for the passage of the lower arm of a U-shaped sliding bar 109, adapted to suitable guiding-openings in the fixed frame, compression-springs 110 and 111 being placed on the said lower arm on opposite sides, respectively, of the clutch-lever, the movement of the latter in one direction compressing one of the springs and relaxing the other, and vice versa. Projecting from the inner face of one of the sills are two guides 112 for the passage of a longitudinally-movable shifting bar 113, which extends parallel with the sill for the greater portion of its length, but is provided with an inwardly-bent intermediate portion 114. This bar passes between a pair of antifriction-rollers 115 on the upper arm of the U-shaped bar 109, and as the bar 113 is moved longitudinally these rollers may be made to ascend and descend the inclined plane in order to compress one or other of the springs 110 111. The bar is further provided at opposite ends with fingers 116 and 117, arranged in different planes and adapted to be operated upon by projections on the carrying-frame of the platform. The initial position of the platform or that in which the sheaves are assembled to form a shock is that shown in full lines in Fig. 3, and in this position the clutch-lever 103 is in the central notch 107 of the latch-bar, the spring 110 being compressed and the clutching-sleeve 93 being in mid-position and disengaged from both of the bevel-gears. When a sufficient number of sheaves have been assembled to form a shock, the latch-bar 105 is released by means of a bell-crank lever 118, pivoted to the sill and having one arm connected by a cord or chain 119 to an operating mechanism, hereinafter described. This mechanism is automatically set into operation at the proper moment, and the latch-bar is raised from the clutch-lever 103, the latter being then thrown in the direction of the notch 108 by means of the compression-spring 110. The latch-lever is released immediately, being only momentarily raised to permit the disengagement of the clutch-lever from the central notch, and said clutch-lever is then caught and retained by the notch 108. The movement of the clutch-lever in this direction causes a corresponding movement of the sleeve 93, the pin 99 being moved into engagement with the recessed face of the bevel-gear 95 and clutching the same to the shaft. This movement operates the shaft 92 and pinion 100 and results in the movement of the platform toward the dotted-line position of Fig. 3. Immediately before the platform reaches the dotted-line position a depending lug 120 on the platform-frame engages the finger 117 of bar 113 and draws the bar forward, causing the rollers 115 to ascend the inclined plane 114 and resulting in an outward movement of the U-shaped bar 109. This movement causes the spring 111 to be compressed, while the spring 110 is now wholly relaxed. When the rollers have reached the top of the inclined plane of bar 113, the finger 117 is disengaged from the lug 120 by contact with a projecting cam-block 121 on the inner face of the frame-sill, the finger being turned and slightly depressed to a point below the lug 120. The platform continues on its rearward movement so long as the clutch-lever 103 remains in the notch 108; but as the limit of movement is reached a pivoted cam 122, carried by the frame of the platform, comes into contact with a projecting lug 123 at the end of the latch-bar, raising said latch-bar from engagement with the clutch-lever and permitting the movement of the clutch-lever to mid-position under the action of the spring 111. This moves the clutching-sleeve 93 to mid-position and the parts remain stationary until it becomes time to start the rearward movement. During the movement of the platform to the front the shock has been deposited on the ground by mechanism hereinafter described, and as this mechanism completes its operation the bell-crank lever 118 is again automatically tripped and raised into contact with the latch-lever 105. The spring 111 at this time is still compressed to an extent sufficient to cause a movement of the clutching-lever in the direction of the notch 106, and when this occurs the clutching-sleeve has been moved until the pin 99 engages with the recessed face of the bevel-gear 94, and the shaft 92 and pinion 100 are rotated in a direction opposite to the previously-described movement, the platform being moved to the rear and returned to initial position. As the platform approaches the limit of its rearward movement a lug 120' on the under side of the platform-supporting frame comes into contact with the finger 116, moving the bar 113 to the rear and causing the rollers 115 to descend the inclined plane 114, and thus compress the spring 110, the spring 11 being at this time wholly relaxed. As the platform nears the limit of its rearward movement a pivoted pawl 122' on the platform-frame comes into contact with the lug 123 on the latch-bar and raises the same momentarily, permitting the clutch-lever to pass from the notch 106 to the notch 107 under the influence of the spring 110. This again moves the clutching-sleeve to mid-position and stops the platform at the proper moment, the clutch-lever being in mid-position and the spring 110 still compressed to an extent sufficient to throw the clutch-lever from the locking-notch 107 to the notch 108 on the next cycle of operation.

Figures 1, 22:
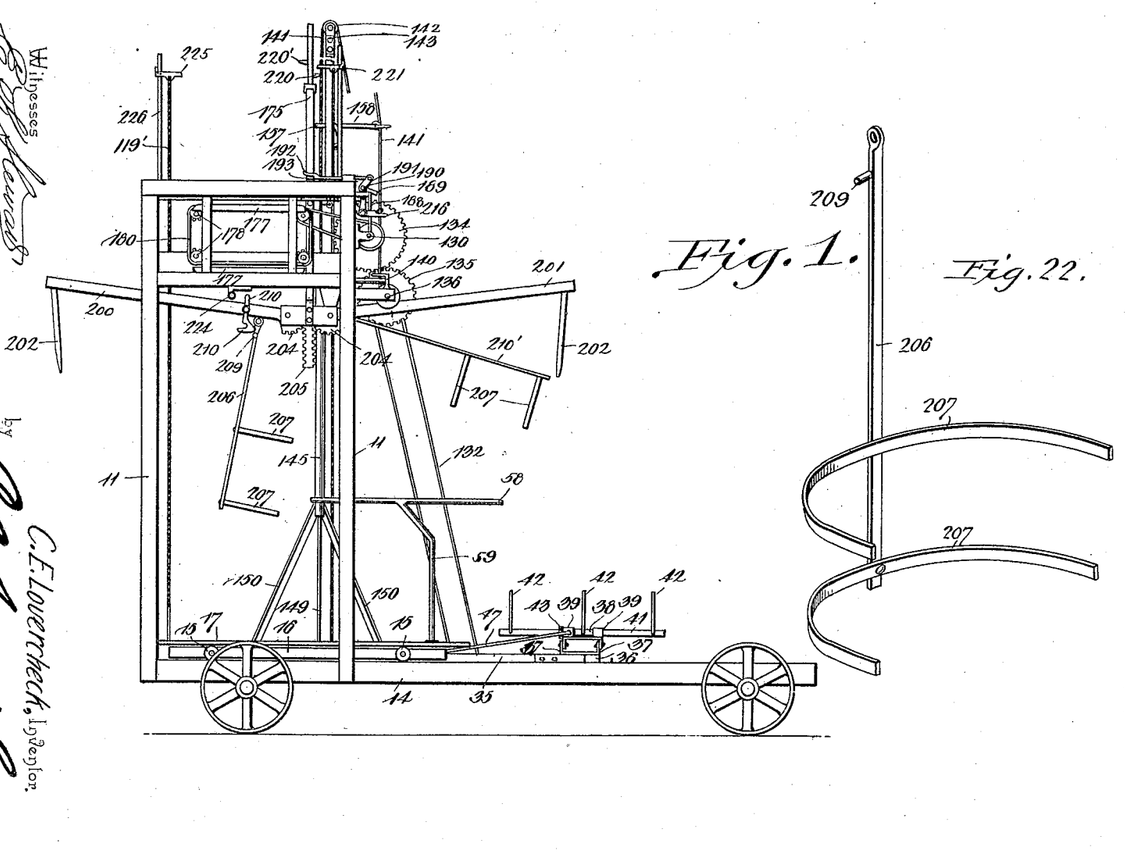
Figure 1 is a side elevation of a grain-shocker constructed in accordance with my invention, the parts being shown in the position assumed during the assembling of the sheaves to form a shock.
Fig. 22 is a detail perspective view of one of the shock-clamps detached.
Figure 2:
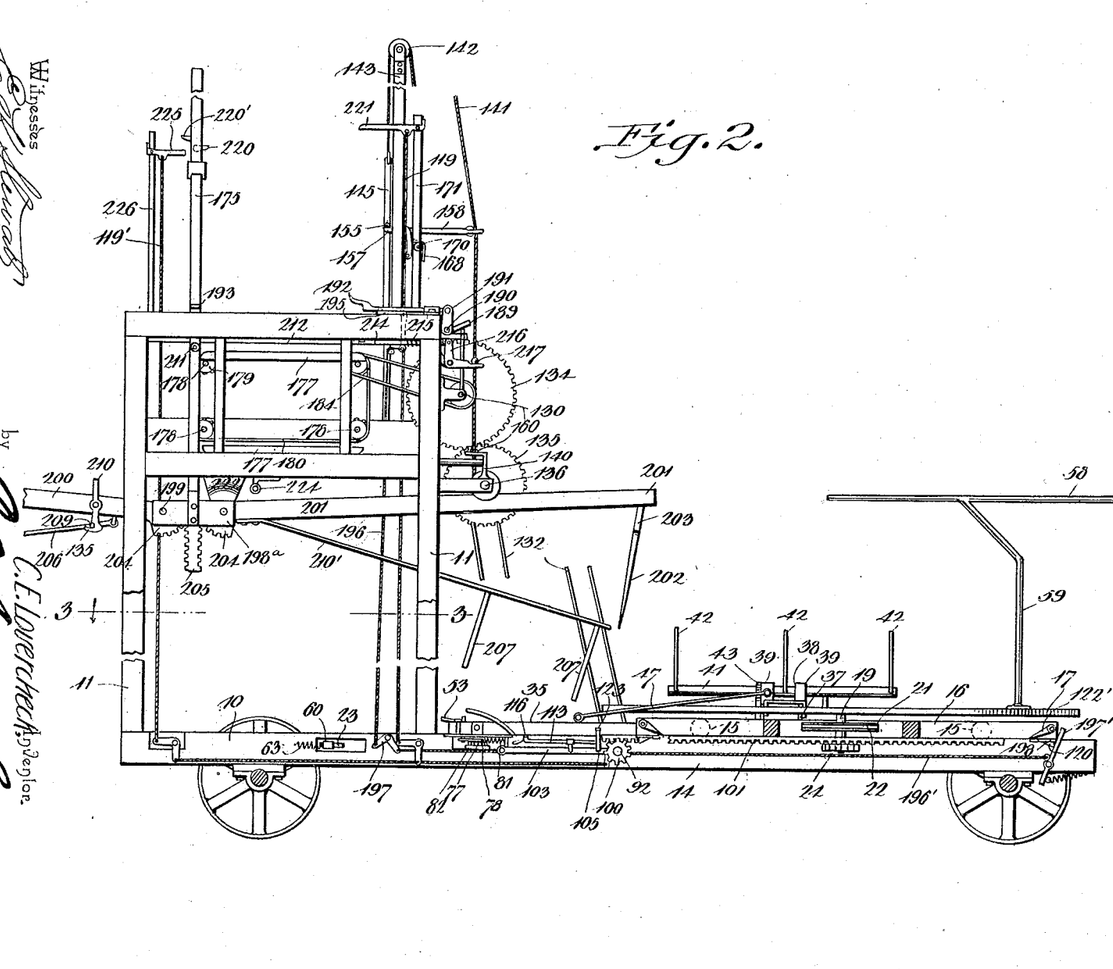
Fig. 2 is a longitudinal sectional elevation of the same, illustrating the position of the parts after a shock has been deposited on the ground and the shock-engaging devices have been elevated preparatory to the return movement to initial position.
Figures 14, 15, 21:
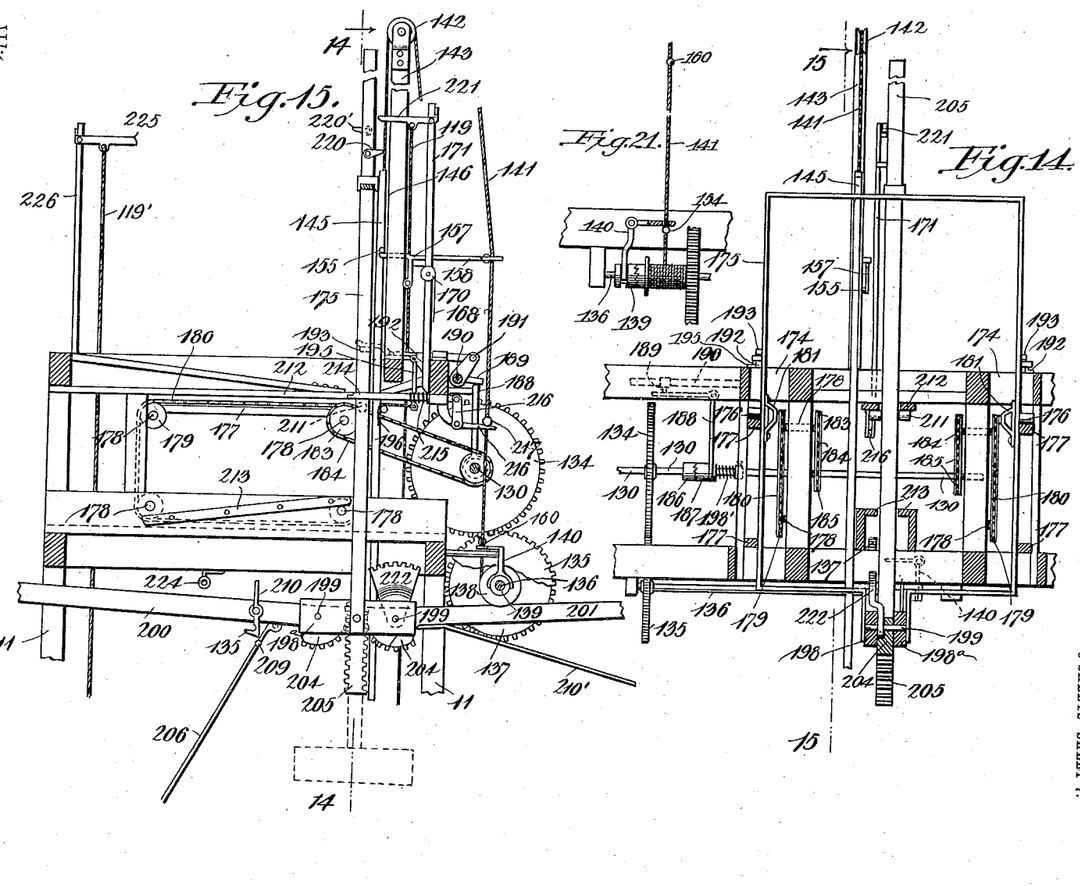
Fig. 14 is a transverse sectional elevation of a portion of the mechanism on the line 14 14 of Fig. 15.
Fig. 15 is a longitudinal sectional elevation of the same on the line 15 15 of Fig. 14.
Fig. 21 is a view in detail of a clutch and winding-drum mechanism having operative connection with the shock-former.
Figures 16, 17, 18, 19:
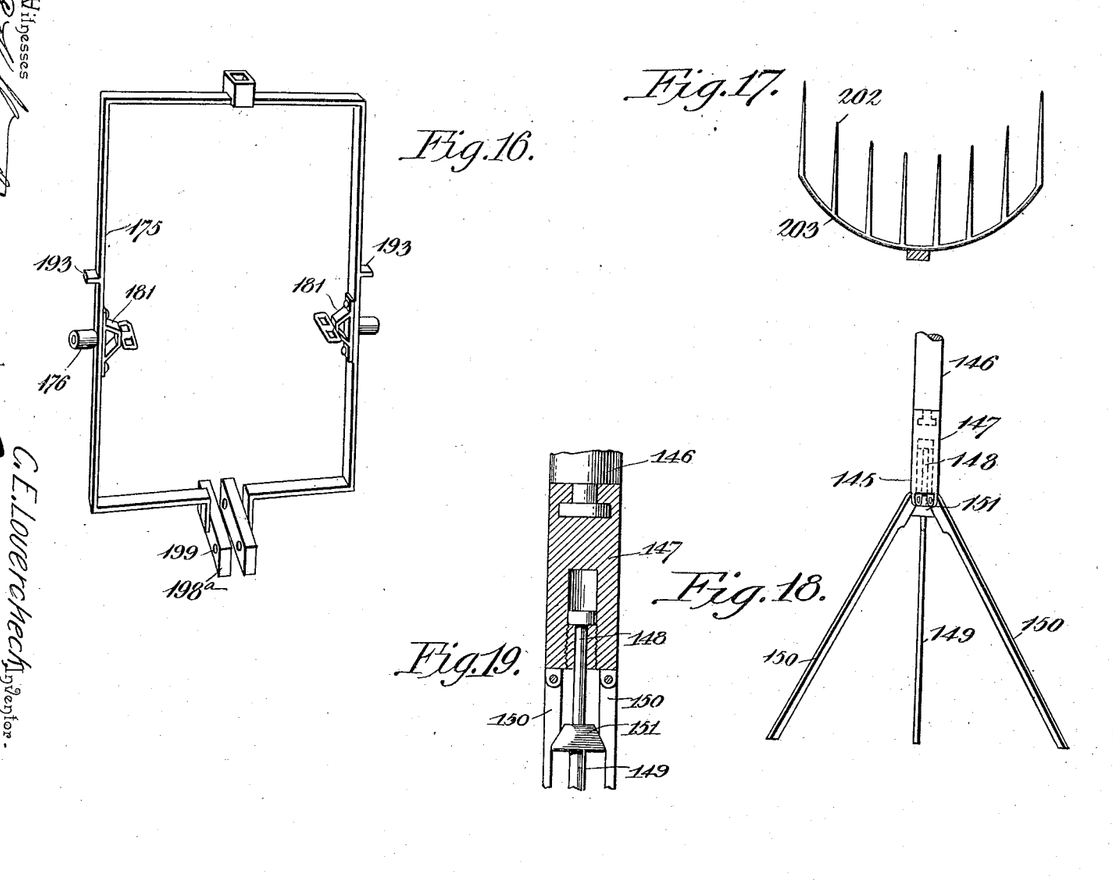
Fig. 16 is a detail perspective view of a rectangular frame employed as a support for the shock-engaging means.
Fig. 17 is a sectional plan view showing the construction of one of the forks and the arrangement of its elongated tines.
Fig. 18 is a detail perspective view of a former to be placed at the center of the platform at the beginning of the shock-forming operation.
Fig. 19 is a detail sectional view of the head of the former.

At the upper end of the frame 11 are suitable bearings for the support of the two-part shaft 130, having at one end a sprocket-wheel 131, which is connected by a link belt 132 to a sprocket-wheel 133, the latter being secured on the elongated hub of the bevel-gear 95, Fig. 11, the sprocket-wheel receiving continuous motion in the same direction during all the time the shaft 28 is clutched to the sprocket-wheel 29. On the shaft is a gear-wheel 134, intermeshing with a gear 135 on a counter-shaft 136. The counter-shaft 136 carries a fixed gear 137 and a loose winding-drum 138, which may be clutched to the shaft by a clutching-sleeve 139 under the control of a bell-crank lever 140, and the movement of the bell-crank lever is controlled by the winding and unwinding of a cord or chain 141 on the drum 138. The cord or chain 141 passes up over a sheave 142 at the upper end of a standard 143, forming a part of the frame. The opposite end of the cord or chain is connected to a shock support or former 145, which is placed at the center of the platform prior to the delivery of the first sheaf of grain and assists in properly holding the sheaves together during the formation of the shock. When the shock is assembled and prior to its delivery, this former is removed from its position, so that the shock engaging and delivering tines or forks may properly operate. The former comprises a vertical spindle 146, arranged over the center of the platform and having at its lower end a swiveled head 147, provided with a lower recess 148 for the reception of a vertically-movable bar 149, which at all times maintains a position in axial alinement with the head and spindle. Pivoted to the lower portion of the head are a number of legs 150, which when the spindle is lowered are engaged by inclined shoulders 151, formed at the upper portion of the vertically-movable bar 149, the legs being thus spread in the form of a tripod and forming a support for the center of the shock. When in operative position, with all of the legs and the central bar resting on the center of the platform, the legs and bar rotate freely with the platform, owing to the swiveled connection between the head 147 and the lower end of the spindle 146. When the spindle is elevated, at the completion of a shock, the inclined shoulders 151 remain in lowered position, and on the further upward movement of the spindle the arms are closed together by gravity, so as not to disturb the sheaves of grain during the removal of the former. The normal position of the former is that illustrated in Fig. 1, the legs being spread and resting on the central portion of the platform. At this time the clutch 139 is held in clutching engagement with the winding-drum 138 by means of a projecting collar or block 154, arranged on the cord or chain 141 and in position to operate the winding-drum as soon as the shaft 28 is clutched to the sprocket-wheel 29. When this clutching operation occurs, motion is transmitted through the gearing connections to the counter-shaft 136, and the cord or chain is wound on the drum, the shock-former 145 being elevated until the upper end of the spindle assumes the position shown in Fig. 15. The spindle 146 is provided with a projecting pin 155, adapted to be engaged and held by one arm of a T-shaped lever 157, pivoted on the standard 143, the lever being normally held in locking position by the tension of the cord or chain 141 against the outer end of one of the lever-arms 158. On the upward movement of the spindle the stud or pin 155 passes the inclined face of the lever, and the latter is forced by the tension of the winding-cord to a position under the roller or pin and serves to hold the same elevated. At the completion of the winding movement a block or similar projection 160 on the cord or chain comes into contact with a bell-crank lever 140 and moves the clutching-sleeve away from the drum, the drum remaining stationary on the counter-shaft 136.

The removal of the shock-former 145 is the first operation subsequent to the application of power to the shaft 28, and said former is maintained in its elevated position during the removal of the shock from the platform and during the traveling of the platform to the full forward position and back again to the initial position to receive sheaves for the formation of another shock. As the platform nears the limit of its rearward movement to normal position a projecting pin 165 on said platform comes into contact with one arm of a bell-crank lever 166, mounted on the fixed frame, the opposite arm of said bell-crank lever being connected by a flexible cable or chain 168 to the T-shaped lever 157, said cable or chain being guided over a sheave 170, mounted on a suitable standard 171 at the upper portion of the framework. When the lever is tripped by this movement of the platform, the shock-former descends by gravity to its normal position, the winding-drum being disconnected from the shaft and offering no resistance to the downward movement of said former. At the conclusion of the downward movement of the former the projection or block 154 on the chain or cord 141 is moved into engagement with the under side of the horizontal arm of the bell-crank lever 140 and results in the clutching of the sleeve 139 to the winding-drum. When this occurs, the clutch connecting the shaft 28 to the sprocket-wheel 29 has been disengaged by the mechanism hereinbefore described, the counter-shaft 136 being stationary at this time, so that the winding-drum, while clutched to the shaft, will not be actuated until on the completion of a shock the shaft 28 is again set into operation.

The upper framework may be considered as divided into inner and outer members, between which are formed two longitudinally-disposed slots 174 for the passage of a rectangular frame 175, the opposite sides of the frame being provided with suitable antifriction-rollers 176, adapted to travel on guideways 177, there being one of such guideways at each side of the frame. In the inner frame members are journals for the support of two sets of shafts 178, there being four of such shafts in each set and each shaft carrying a sprocket-wheel 179, over which extends a link belt 180, arranged in substantially rectangular form and following the contour of the guideway 177. From the inner face of each side of the frame projects a small bracket 181, which is connected to one of the chain-links, the connection insuring a movement of the frame 175, with the belts, through a cycle of operations including, first, a downward movement; second, a rearward movement; third, an upward movement; fourth, a forward movement to the initial position, being the position indicated in Fig. 15. To impart the necessary movement to the two link belts, two of the shafts 178 are extended through the supporting-frame and at their inner ends are provided with sprocket-wheels 183, connected by link belts 184 through sprocket-wheels 185 on the shaft 130, and when this section of the shaft is clutched to the section carrying the sprocket-wheel 131 the necessary movement is imparted to the two sets of link belts carrying the frame 175, and the latter begins its movement to effect the removal of the shock from the platform and the delivery of the same to the ground.

To one of the shaft-sections 130 is secured a clutching-sleeve 186, and to the opposite section is secured a clutching-sleeve 187, feathered to the shaft and movable longitudinally thereof by a bell-crank lever 188, pivoted to the frame and having one arm bifurcated and fitting within a groove in the clutching-sleeve, the opposite arm extending under a rocker-arm 189 on a rock-shaft 190, carried by the main frame. The rock-shaft is provided with two arms 191, to which are pivoted slidable bars 192, adapted to guides at the top of the frame and having their rear ends in the path of movement of lugs 193, carried by the frame 175, said lugs engaging with the bars each time the frame 175 reaches the limit of its forward movement in assuming the normal position illustrated in Fig. 15. When the lugs engage the bars 192, the latter are forced forward, and on depressing the arm of the bell-crank lever 188 the clutching-sleeve 187 is disengaged from the clutching-sleeve 186 and one section of the shaft 130 becomes stationary and stops the movement of the link belts 180. The clutch is held disengaged until such time as it becomes necessary for the frame 175 to start into operation, and at this time one of the bars 192 is engaged by one arm by the bell-crank lever 195, pivoted to the frame, the opposite arm of said lever being connected by a cable 196 with a bell-crank lever 197, fulcrumed on the main frame. The platform-frame is provided with a lug 198, which just before the platform reaches the full forward position (indicated by dotted lines in Fig. 3) engages the lever 197', which is connected to the bell-crank lever 197 by a cord 196', and raises the bell-crank lever 195, the latter elevating the bars 192 above the lugs 193 of the frame and permitting a clutching movement of the sleeve 187 under the influence of a spring 198', the shaft-sections being thus connected together and motion imparted to the link belts and the frame 175, carried thereby.

To the lower portion of the frame 175 are secured two bars or plates 198ª, carrying pivot-pins 199, on which are hung fork-arms 200 201, said fork-arms being each provided with elongated tines 202, arranged on curved bars 203 in order to conform to some extent to the contour of the approximately circular shock carried by the platform. At the upper end of each fork-arm is a gear-segment 204, and between these two segments is mounted a double rack-bar 205, adapted to engage with and operate both segments at the same time, a downward movement of the rack-bar causing the opening of the forks and a movement in the opposite direction causing the forks to close upon the shock. To the fork-arm 200 is pivoted a shock-clamp in the form of a bar 206 having at its lower end a pair of approximately semicircular bars 207, which engage the shock in advance of the forks and during the disengagement of the forks from the shock serve as strippers to prevent the overturning of the shock. The rear clamp-bar 206 when in normal position, or in that position where the platform is receiving the sheaves to form a shock, is lowered to the position indicated in Fig. 15 and acts, in connection with the previously-described guard 58, as a support for the sheaves during the shock-forming operation. When the fork-arms descend from the position shown in Fig. 15 to engage the shock, a pin 209 on the clamp-bar is automatically engaged by a catch 210, pivoted on the fork-arm 200, and when said fork-arm is disengaged from the shock said catch serves to elevate the clamping-arm with the fork-arm and raise the same clear of the shock. To the front fork-arm 201 is connected a clamping-bar 210', carrying curved clamps similar to those on the bar 206 and bearing corresponding reference-numerals. The bar 210' is connected to the fork-arm 201 in such manner that it normally maintains a position in advance of or below the fork-arm, the bar being formed of a piece of spring metal which when the fork-arm is forced into engagement with the shock will yield until the clamping-bars are pressed against the bar 201. The clamping-bar 210' acts as a stripper for the forks carried by the arm 201 in that on the disengaging movement of the fork-arm 201 the spring-bar 210' will retain its position against the shock until the tines are fully withdrawn, after which the continued upward movement of the fork-arm will also elevate the clamping-bar.

The rack-bar 205 is provided on each side with an antifriction-roller 211, adapted during its reciprocating movement to travel in contact with upper guides 212, disposed parallel with the upper run of the link belts 180 and lower guides 213, arranged at an angle to the lower run of said link belts. When in the position shown in Fig. 15, the weight of the fork-arms would naturally tend to elevate the rack-bar 205 by gravity; but this is prevented by the latch 214 forming a continuation of the upper guide 212 for the rack-bar antifriction-rollers, said rollers at the completion of the forward movement of the rack-bar passing beyond the end of the guideways 212 and coming into contact with the latch 214. The latch 214 is guided in the frame and maintained in locking position by a tension-spring 215. To the outer end of the latch is connected one arm of a bell-crank lever 216, hung on a bracket on the frame, the opposite arm of said bell-crank lever being bifurcated for the passage of the cable or chain 141, and said cable or chain is provided with an enlarged block 217 or similar device which at the proper moment is brought into operative engagement with the bell-crank lever to remove the latch 214 from contact with the antifriction-roller 211 of the rack-bar. This movement occurs when on the winding movement of the cable 141 the spindle of the shock-former 145 has reached its highest position, and as soon as the latch is withdrawn the weight of the fork-arms causes the rack-bar to ascend, the forks dropping into contact with the shock and the tines being partly entered in the sheaves. When the rack-bar reaches its limit of upward movement, a pivoted dog 220, carried by said bar, engages a pivoted arm 201, carried by a standard 171, and said pivoted bar is connected to the cable 119, which, as previously described, extends to the bell-crank lever 118 under the latch-bar 105. This movement releases the latch and permits the clutch-lever 103 to move into engagement with the inner notch 108 of the latch-bar, the platform-actuating shaft 92 being clutched to the bevel-gear 95 and the platform started on its movement toward the front of the machine. Before the front is reached, however, the bell-crank lever 192 is elevated to release the clutch-sleeve 187 and permit the latter to engage the clutch-sleeve 186 on the shaft 130 and start the movement of the link belts 180 and the frame 175. Previous to this, however, the dropping of the fork-arms to engagement with the shock has resulted in the bringing of a segment 222 on the pivot or stud of the rear fork-arm into engagement with the revolving gear-wheel 137 and the latter has positively forced the forks into engagement with the shock, the movement of the gear-wheel being transmitted, through the segment 222 and the front fork-segment, to the rack-bar and the rear fork-segment, and at the end of the movement the releasing movement of the bar 221 occurs to start the platform toward the front. At this time the clutching mechanism connects the bevel-gear 95 to the shaft 92 and the pinion 100 is engaging the rack 101 and moving the platform toward the front from under the shock, the latter being firmly held and supported by the forks. As the platform nears the limit of its forward movement the link belts 180 are set into operation in the manner previously described and the frame 175 moves down until the shock is in contact with the ground, and thence, the machine continuing its forward movement, the frame is started on a rearward movement with the lower run of the link belts, the speed being approximately the same as the forward speed of travel of the machine, so that the shock will practically remain in a stationary position. As soon as the shock touches the ground the rollers 211 of the rack-bar are engaged with the inclined lower guides 213, and as the rearward movement of the forks and rack-bars continue the rack-bar is gradually depressed and through the segments gradually elevates the two fork-arms, the stripper-bars 206 and 210' remaining in engagement with the sides of the shock until the tines of the forks are fully removed, after which the strippers or clamps are also elevated, the full open movement being reached at the time the rollers 211 arrive at the rear end of the guides 213. At the upward run of the belt, or the vertical lift, which occurs after the antifriction-rollers leave the inclined plane 213, the fork-arms are maintained in open position by friction, there being insufficient time to permit the falling of the fork-arms between the time the rollers leave the inclined plane 213 and engage with the upper guides 212. The shock is thus left carefully on the ground and the forks removed and elevated in such manner as to prevent the accidental toppling of the shock. As the movement of the frame 175 continues the rollers 211 travel along the guideways 212 and thence under the latch-bar 214, assuming the normal position. Immediately before the parts reach the position shown in Fig. 15 the catch 210, which supports the rear clamp-bar 206 in position, is engaged by a stud 224, extending from the fixed frame, the clamp-bar being released and allowed to fall to a position to the rear of the shock and act as a guide for the sheaves while the shock is being assembled.

In order to start the platform on its rearward movement at the proper time, I employ a pivoted bar 225, carried by a standard 226 at the rear end of the frame and connected by a cable 119' to the cable 119 and thence to the bell-crank lever 118, which controls the movement of the latch-bar 105. When the latch-bar 225 is raised by the engagement therewith of a pawl 220' on the upper portion of the rack-bar, the position of the clutch is changed in the manner previously described and the platform is returned to its initial position while the frame 175 is traveling toward the front of the machine. When the frame 175 reaches its full forward position, the lugs 193 on said frame engage the slidable bars 192 and through the rock-shaft 190 and arm 198 depress the bell-crank lever 188 and remove the clutching-sleeve 187 from engagement with the clutching-sleeve 188 from the shaft 130. This stops the movement of the frame and forks with the parts in the position illustrated in Fig. 15. As the platform is returning to initial position it operates the clutching mechanism controlling its own movement and then serves to rotate the ratchet-wheel 77 to the extent of one tooth, moving the recessed portion of the cam 82 out of contact with the arm 83 and unclutching the shaft 28 from the constantly-revolving spocket-wheel 29, thus stopping the movement of all parts of the machine with the exception of the mechanism for receiving and delivering the shocks to the platform and for revolving said platform. At the completion of the platform movement the lever 157 is released from the spindle 146 of the shock-former 145 and the latter descends by gravity, its legs being automatically spread at the center of the platform and all of the parts being thus returned to a normal position in readiness for the formation of a fresh shock.

While the construction herein described and illustrated in the accompanying drawings is the preferred form of the device, it is obvious that various changes in the form, proportions, size, and minor details of the structure may be made without departing from the spirit or sacrificing any of the advantages of the invention.

Having thus described the invention, what I claim is—

1. A grain-shocker comprising a platform, means for assembling sheaves of grain on the platform to form a shock, means for moving the platform from under the shock, and means for engaging said shock and depositing the same on the ground after the movement of the platform.

2. A grain-shocker comprising a revoluble platform, means for assembling sheaves of grain thereon in the form of a shock, means for moving the platform from under the shock, and means for engaging the shock and depositing the same on the ground after the movement of the platform.

3. A grain-shocker comprising a revoluble platform, means for imparting a step-by-step rotative movement thereto, means for receiving sheaves of grain and assembling the same on the platform in the form of a shock, means for removing the platform from under the shock, and a shock engaging and delivering means having a rearward movement to counteract the effect of the forward movement of the shocker.

4. A grain-shocker comprising means for assembling sheaves of grain in the form of a shock, a shock engaging and delivering means for lowering the shock to the ground, said engaging and delivering means having a rearward movement after the shock has been deposited on the ground, and mechanism for separating the shock engaging and delivering means from the shock during such rearward movement.

5. The combination in a grain-shocker, of a receiving-platform movable to operative and inoperative positions, means for assembling a plurality of sheaves on the platform when in operative position, shock-engaging forks, and means for operating said forks and for moving the same in a rearward direction to counteract the effect of the forward movement of the shocker.

6. The combination in a shocker, of a revoluble platform, means for imparting a step-by-step rotative movement thereto, means for receiving sheaves of grain in approximately horizontal position, turning the sheaves to vertical position and delivering the sheaves to the platform to form a shock, mechanism controlled by the delivering means for automatically moving the platform, and means for engaging supporting and lowering said shock to the ground.

7. The combination in a shocker, of a revoluble platform, mechanism for imparting a step-by-step rotative movement thereto, an oscillating arm having at one end a means for engaging sheaves of grain and for delivering the same successively to the platform to form a shock, means for moving the platform from under the shock and means for delivering a shock from the platform.

8. The combination in a shocker, of a revoluble platform, means for operating the same, an oscillating arm having at one end a plurality of tines for receiving sheaves of grain in an approximately horizontal position, means for moving the tines to turn the sheaves to vertical position during the oscillatory movement of the arm, and means for delivering a shock formed of a plurality of sheaves.

9. The combination in a shocker, of a revoluble platform, means for turning the same, a pivoted arm having an oscillatory movement in both a horizontal and a vertical plane, sheaf receiving and delivering means disposed at the end of said arm and adapted to receive a sheaf in approximately horizontal position, mechanism for turning the sheaf to vertical position during the oscillatory movement of the arm, and means for delivering a plurality of sheaves in the form of a shock.

10. The combination in a shocker, of a receiving-platform, an oscillatory arm having movements in both vertical and horizontal planes, means for turning said arm from receiving to delivering position, sheaf-engaging tines arranged at the free end of the arm and adapted to receive the sheaves in an approximately horizontal position, means for turning the tines to present the sheaf to the platform in vertical position, and means for automatically releasing the tines from the sheaf.

11. The combination in a shocker, of a receiving-platform, an oscillatory arm having movements in both vertical and horizontal planes, a pair of rock-shafts arranged at the free end of the arm, tines carried by said rock-shafts and adapted to engage successive sheaves in an approximately horizontal position, means for turning the shafts and the sheaf to vertical position before delivering the latter to the platform, means for automatically rocking the shafts to cause the tines to engage with and disengage from successive sheaves, and means for delivering a plurality of sheaves from the platform in the form of a shock.

12. The combination in a shocker, of a revoluble platform, an oscillating arm, means for operating the same, a pivoted block mounted at the free end of said arm, a pair of rock-shafts journaled in said block and having sheaf-engaging tines, means for turning said block on its pivot to move the shafts and sheaf to vertical position, means for automatically rocking said shafts to cause the tines to engage with and disengage from the sheaves, and means for delivering a plurality of sheaves from the platform in the form of a shock.

13. The combination in a shocker, of a revoluble platform, means for operating the same, an oscillatory arm, a block pivoted thereto, a second block pivoted to the first, rock-shafts carried by said second block, a plurality of sheaf-engaging tines carried by the rock-shafts, a connecting-rod extending from the under side of the first block to a fixed point, a second rod extending from one side of the second block to a point on the arm, and mechanism for operating the rock-shafts at the beginning and end of the movement of said oscillatory arm, substantially as specified.

14. In a device of the class specified, a grain-shocker comprising a revoluble platform, means for imparting a step-by-step rotative movement thereto, a pivoted arm adapted to receive and deliver successive sheaves of grain to the platform, a block pivoted to the outer end of the arm and movable from a horizontal receiving position to a vertical delivery position, a secondary block or frame pivotally connected to the first and having bearings for the reception of a pair of rock-shafts, rock-shafts mounted therein, gearing connecting the two shafts for simultaneous movement in opposite directions, a pin depending from one of the shafts and adapted to engage a fixed point in the path of movement of the pin, a torsion-spring mounted on one of the shafts and tending to return the same to initial position after each operation, means for elevating the arm during its movement to deliver the sheaf, means for operating the arm, and means for delivering a plurality of sheaves in the form of a shock from the platform.

15. The combination in a grain-shocker, of a revoluble platform, an oscillating arm, a pin carried thereby, a continuously-revolved wheel having a plurality of pin-receiving openings, means for engaging and disengaging the pin from the openings, a sheaf receiving and delivering means at the free end of the arm, and means for returning the arm to an initial receiving position after each operative movement.

16. The combination in a grain-shocker, of a revoluble platform, an oscillating arm, a driven wheel to which said arm may be connected for operative movement, a pin for locking the arm and wheel together, means for automatically engaging the pin with the wheel at the beginning of an operative movement, means for automatically disengaging the pin at the completion of a movement, means for returning the arm to initial position after each operation, and a sheaf receiving and clamping device arranged at the outer end of the arm and having a movement independent of that of the arm.

17. The combination in a grain-shocker, of the pivoted arm, a sheaf receiving and clamping device arranged at the outer end of said arm, means for turning the sheaf receiving and clamping device from a horizontal to a vertical position, and an inclined arm adapted to raise the arm during the movement of the latter to delivering position.

18. The combination in a grain-shocker, of the pivoted arm, a pair of shafts supported by the arm, sheaf-clamping tines carried by said shafts, gearing connecting the shafts, a pawl adapted to engage with a portion of the gearing to retain the shafts in operative position, means for effecting a movement of the shafts to close the tines on a sheaf, and means for automatically disengaging the pawl from the gearing when the arm has been moved to delivering position, and means for returning the shafts and tines to initial position when released.

19. The combination in a grain-shocker, of a platform, means for assembling sheaves of grain on said platform in the form of a shock, means for moving the platform from under the shock, and means for engaging with and lowering the shock to the ground.

20. The combination in a grain-shocker, of a platform, means for assembling sheaves of grain on the platform in the form of a shock, means for moving the platform from under the shock, forks for engaging the shock preliminary to the movement of the platform, and means for imparting a rearward and downward movement to said forks.

21. The combination in a grain-shocker, of a platform, means for assembling sheaves of grain on the platform in the form of a shock, means for moving the platform from under the shock, means independent of the platform for engaging the shock and for lowering the same to the surface of the ground and for imparting a rearward movement to said engaging means during the delivery of the shock.

22. The combination in a grain-shocker, of a platform, means for assembling sheaves of grain on the platform in the form of a shock, means for moving the platform from under the shock, forks for engaging the shock in advance of the movement of the platform, means for imparting a downward and rearward movement to the forks, and means for releasing the forks from the shock during such rearward movement.

23. The combination in a grain-shocker, of a platform adapted to support an assembled shock, forks for engaging the shock, gear-segments forming part of the forks, a downwardly and rearwardly movable frame carrying the forks, a rack-bar engaging the gear-segments and serving as a means for moving the forks to open and closed positions, and means for engaging and depressing said rack-bar during the rearward movement of the frame and forks.

24. The combination in a grain-shocker, of a platform adapted to support an assembled shock, forks for engaging the shocks, gear-segments carried by the forks, a downwardly and rearwardly movable frame carrying the forks, endless chains to which said frame is secured, means for driving said chains, a vertically-movable rack-bar engaging the gear-segments, antifriction-rollers carried by the rack-bar, and an inclined plane for engaging said antifriction-rollers during the rearward movement of the frame and forks.

25. The combination in a grain-shocker, of the platform, a frame comprising a central spindle, a revoluble head swiveled thereto, a plurality of folding arms carried by the head and a central bar having inclined shoulders for engaging with and spreading said arms.

26. The combination in a grain-shocker, of the platform, a former adapted to rest thereon and partly support the sheaves of grain when being assembled, a winding-drum, a flexible connection between the former and the winding-drum, mechanism for actuating the winding-drum and means for automatically connecting and disconnecting said drum and actuating mechanism.

27. The combination in a grain-shocker, of the revoluble platform, a reciprocating frame carrying said platform, guides for the frame, means for automatically reciprocating said frame to assist in the delivery of a shock, means for delivering sheaves of grain to said platform, and means independent of the platform for engaging and lowering the shock to the ground.

28. The combination in a grain-shocker, of the revoluble platform, a frame carrying the same, means for delivering sheaves of grain to said platform to form a shock, means for automatically shifting the frame to remove the platform from under a formed shock, means for automatically returning the frame and platform to initial position after the shock has been removed, and means independent of the platform for engaging and lowering the shock to the ground.

29. The combination in a grain-shocker, of a revoluble platform, means for imparting a step-by-step movement thereto, a reciprocating frame carrying said platform, means for automatically moving the frame, an oscillating arm having means for receiving sheaves of grain and for depositing the same upon the platform in the form of a shock, shock engaging and removing forks, and a single operating-shaft having an operable connection with an external source of power and operatively connected to the various movable parts of the shocker, substantially as specified.

In testimony that I claim the foregoing as my own I have hereto affixed my signature in the presence of two witnesses.

CHARLES E. LOVERCHECK.

Witnesses:
G. W. WASSON,
MANOR J. MONTARYE.